(12) United States Patent
Abraham et al.

(10) Patent No.: US 8,127,066 B2
(45) Date of Patent: *Feb. 28, 2012

(54) COMPUTER SYSTEM WITH PERIPHERAL MODULES ATTACHED TO A DISPLAY/CPU ASSEMBLY

(75) Inventors: Benjamin Abraham, Cupertino, CA (US); Yancy Chen, Campbell, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/841,917

(22) Filed: Jul. 22, 2010

(65) Prior Publication Data

US 2010/0287322 A1 Nov. 11, 2010

Related U.S. Application Data

(63) Continuation of application No. 12/250,047, filed on Oct. 13, 2008, now Pat. No. 7,793,026.

(51) Int. Cl.
*G06F 13/00* (2006.01)

(52) U.S. Cl. .............. 710/303; 361/679.21; 361/679.22; 361/679.23; 361/679.41; 361/728; 361/729; 361/731

(58) Field of Classification Search ............. 361/679.21, 361/679.22, 679.23, 679.41, 728, 729, 731; 710/303, 304

See application file for complete search history.

(56) References Cited

U.S. PATENT DOCUMENTS

| | | | |
|---|---|---|---|
| 6,489,932 B1 | 12/2002 | Chitturi et al. | |
| 6,807,050 B1 | 10/2004 | Whitehorn et al. | |
| 6,957,287 B2 * | 10/2005 | Lou et al. | 710/72 |
| 7,093,057 B2 * | 8/2006 | Choi | 710/313 |
| 7,350,011 B2 * | 3/2008 | Keely et al. | 710/303 |
| 7,587,726 B2 * | 9/2009 | Leung | 720/600 |
| 7,589,959 B2 * | 9/2009 | Ikeda | 361/679.21 |
| 7,793,026 B1 * | 9/2010 | Abraham et al. | 710/303 |
| 2002/0095534 A1 * | 7/2002 | Bae | 710/16 |
| 2004/0150945 A1 * | 8/2004 | Mache et al. | 361/683 |
| 2005/0270731 A1 * | 12/2005 | Yin | 361/681 |
| 2007/0168593 A1 * | 7/2007 | Montag et al. | 710/303 |
| 2008/0002350 A1 * | 1/2008 | Farrugia | 361/686 |
| 2008/0091858 A1 | 4/2008 | Zhang et al. | |

* cited by examiner

*Primary Examiner* — Glenn A Auve

(57) ABSTRACT

A modular computer includes a display with a docking station on its back side. A CPU module connects to the docking station. Peripheral modules connect with the resulting display/CPU assembly so that the peripheral modules contact the back side of the display screen.

20 Claims, 5 Drawing Sheets

COMPUTER SYSTEM WITH PERIPHERAL MODULES ATTACHED TO A DISPLAY/CPU ASSEMBLY

CROSS REFERENCE TO RELATED APPLICATIONS

This application for a patent is a continuation claiming priority to currently application Ser. No. 12/250,047 filed Oct. 13, 2008 now U.S. Pat. No. 7,793,026.

BACKGROUND

"All-in-one" desktop computers that integrate a large flat-screen monitor provide a relatively uncluttered desktop to enhance a user's computer experience. Where a conventional computer system requires at least a computing unit and a display, respective power cords, and a video cable, an all-in-one computer requires only one integrated component and a power cord.

Conventional computers with separate computing units and monitors permit a computing unit to be replaced while the monitor is retained, and vice-versa. In the case of a typical all-in-one computer, replacing the computing unit requires replacing the monitor and vice versa. Thus, if the computing unit fails or needs to be upgraded, a still fully functional monitor may need to be replaced along with the CPU. Accordingly, prospective customers desiring the elegance of an all-in-one computer may elect instead to accept the clutter associated with a conventional computer to avail themselves of the more convenient and cost-effective repair and upgrade possibilities.

BRIEF DESCRIPTION OF THE DRAWINGS

The features and advantages of the embodiments as well as additional features and advantages thereof will be more clearly understood hereinafter as a result of a detailed description of the preferred embodiments of the invention when taken in conjunction with the following drawings in which.

DETAILED DESCRIPTION

The embodiments described herein provide for a computer in which the rear of the display serves as a foundation for supporting plural modules. The display provides structural support, power, and image input from the modules. The result is a system that has the uncluttered feel of an all-in-one computer, but with more convenient customization, repair, and upgrading.

Figure 1:
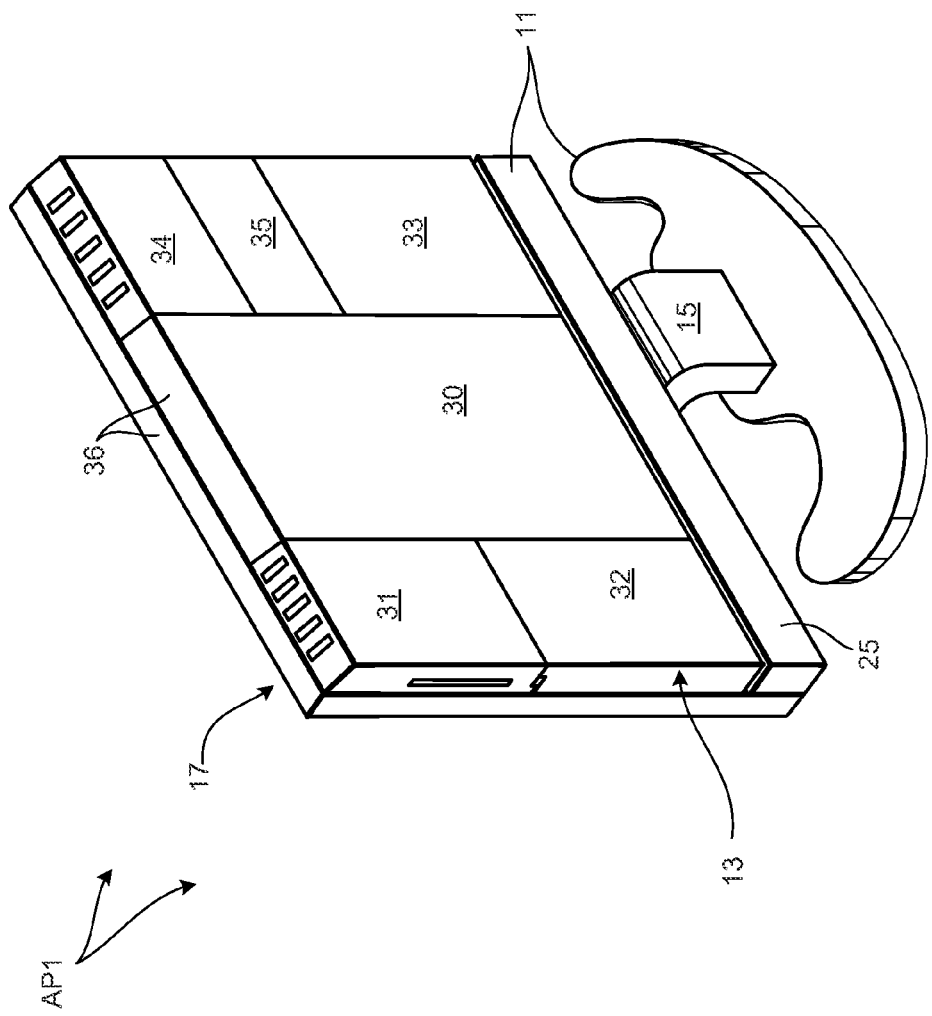
FIG. 1 is a schematic perspective view of a modular all-in-one computer in accordance with an embodiment of the invention.
Figure 2:
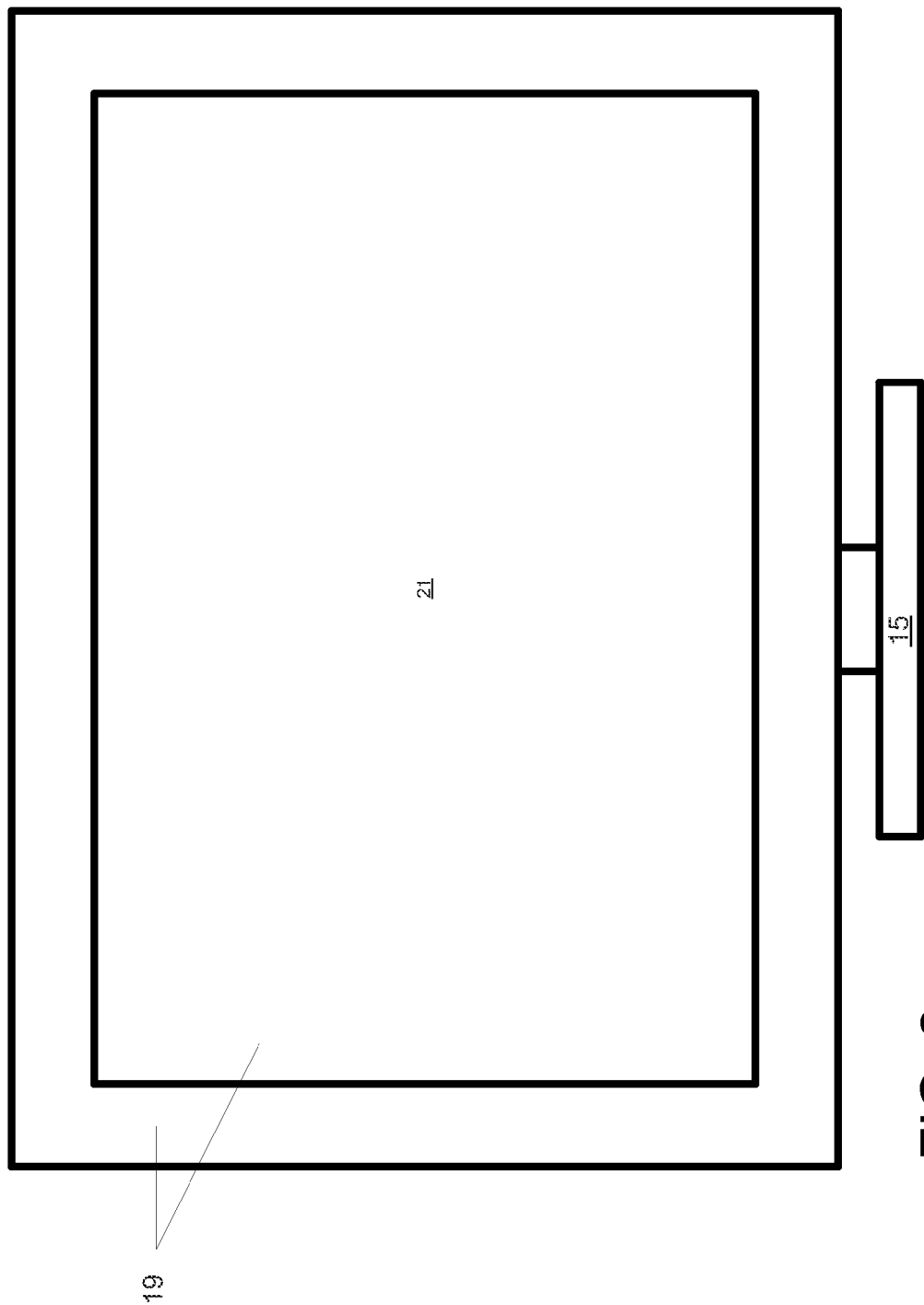
FIG. 2 is a schematic front view of the system of FIG. 1.

A modular computer AP1 comprises a display assembly 11 and a processing slice 13, as shown in FIG. 1. Display assembly 11 includes a support structure, namely stand 15, and a display 17. Display 17 has a front side 19 with a display screen 21 (shown in FIG. 2) and a rear side 23 (best seen in FIG. 3). Rear side 23 includes a docking bar 25, which provides for display 17 serving as a docking station. Processing slice 13 includes a CPU module 30, a hard disk module 31, a graphics module 32 including a graphics processor, an optical drive module 33, an I/O module 34, and a TV tuner module 35. Graphics module 32 (FIGS. 1 and 3), receives instructions from the CPU module 30, generates images and communicates them through CPU module 30, which forwards them to display 27 to be presented on screen 21.

Figure 3:
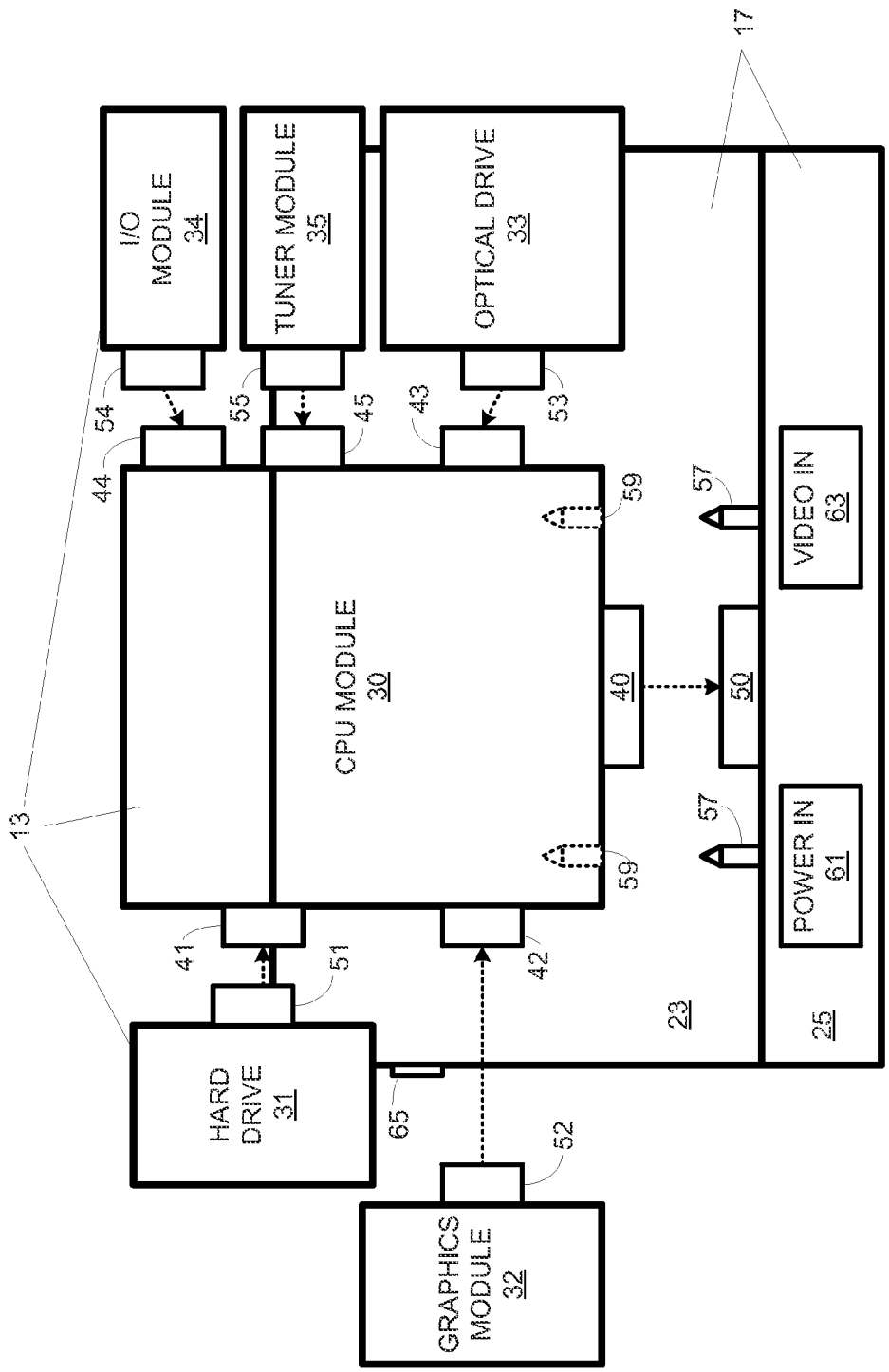
FIG. 3 is a schematic exploded view of the modular computer system of FIG. 1.

As indicated in FIG. 3, CPU module 30 plugs vertically into docking bar 25, to define a CPU/display assembly 36 (FIG. 1). Peripheral modules 31-35 engage CPU/display assembly 36 and CPU module 30 laterally. CPU module 30 includes a CPU docking connector 40 and peripheral docking connectors 41-45, which mate respectively to connectors 50-55 of docking bar 25 and peripheral modules 31-35 to define rigid cable-less connections. Guide pins 57 of docking bar 25 mate with corresponding holes 59 of CPU module 30 to ensure alignment of connectors 40 and 50 during installation of CPU module 30. In an alternative embodiment, peripheral modules connect directly to a display, through which they communicate with a CPU module. In that and the illustrated case, the module connections and interconnections are rigid and cableless.

Docking bar 25 includes a power-in connector 61 and a video-in connector 63. AC power is provided, e.g., from a wall outlet, to computer AP1 via power input connector 61. Docking bar 25 includes a power supply that can be a replaceable module that converts the received AC power to DC, which is converted to suitable voltages and distributed for use by display 17, CPU module 30, and peripheral modules 31-35.

Video-in connector 63 is positioned on the back of docking bar 25 so that it is accessible even when CPU module 30 and peripheral modules 31-35 are attached. Video-in connector 63 can receive a video signal from a separate computer so that display 17 can be used as a monitor even when no modules are attached thereto. Display 17 includes a source selector switch 65 that can be a manual switch or an electronic switch for selecting between the external computer coupled to video input 63 and CPU module 30 when both are connected to display 17.

Figure 4:
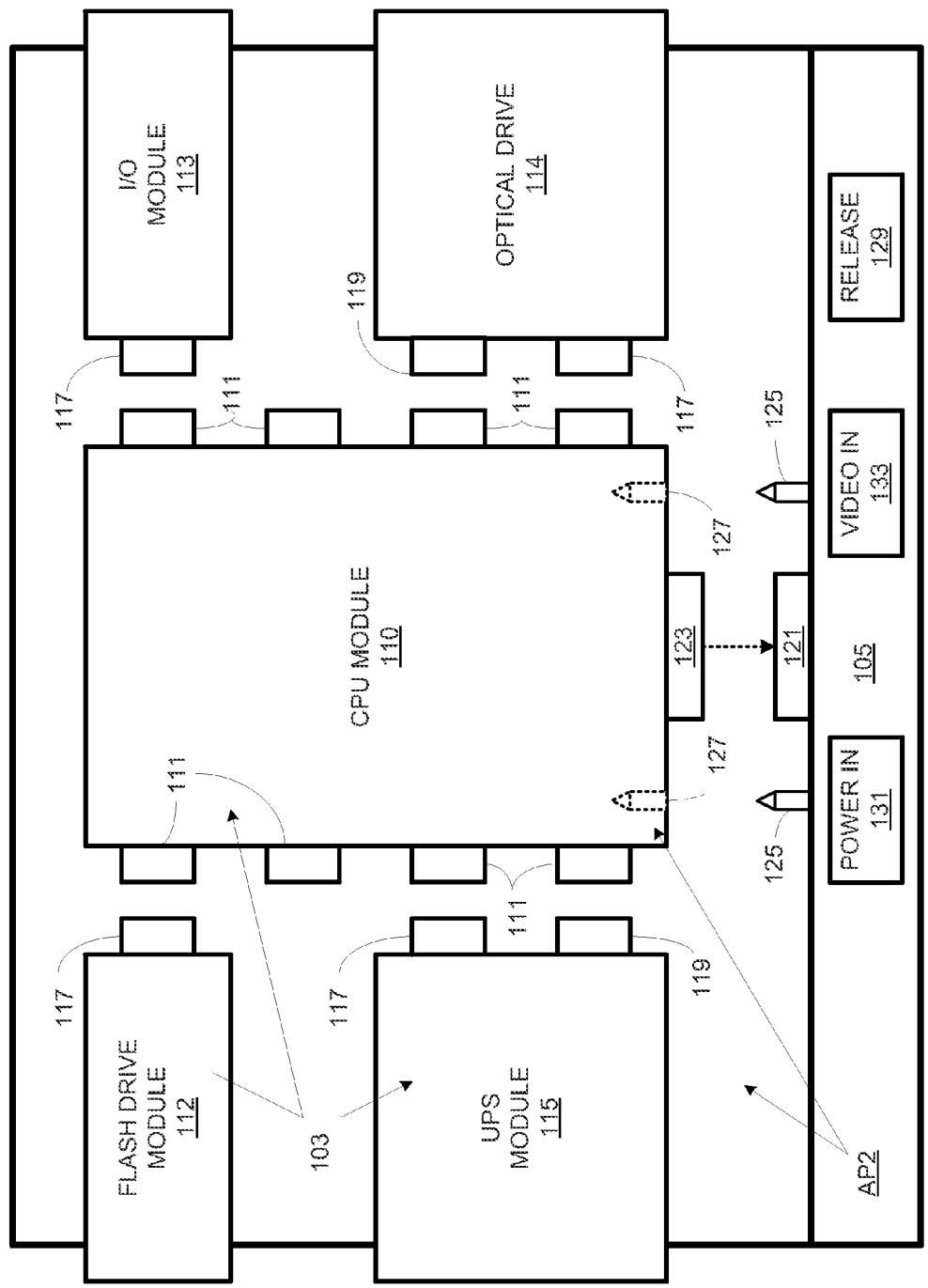
FIG. 4 is a schematic exploded view of an alternative modular all-in-one system.

A computer system AP2, represented in FIG. 4, takes modularity a step further by employing a uniform form factor for peripheral modules. System AP2 includes a display 101 and a processing slice 103. Display 101 includes a screen on its front side and a docking bar 105 on its back side (the side shown in FIG. 4). A CPU module 110 can be physically attached to and electrically connected to docking bar 105.

CPU module 110 has evenly spaced and identical trapezoidal connectors 111 so that there is room for four single-width modules, e.g., flash drive module 112 and I/O module 113, per lateral side of CPU module 110. Double-width modules, e.g., an optical drive module 114 and a UPS (uninterruptible power supply) module 115 are accommodated using matching pairs of connectors. All peripheral modules, e.g., modules 112-115, include active connector 117 for rigid cableless connectivity with CPU module 110. Double-width modules 114 and 115 also include passive (terminator) connectors 119 for additional physical support, but they do not provide for electrically connectivity. Connectors 111, 117, and 119 are trapezoidal to provide lateral symmetry and vertical asymmetry. This allows peripheral modules to be used on either side of CPU module 110 while preventing inverted installations.

Docking bar 105 includes a connector 121 for mating with a respective connector 123 of CPU module 110. To aid in alignment during installation of CPU module 110, docking bar 105 is provided with guide pins 125 to mate with guide holes 127 of CPU module 110. Once installation is complete, guide pins 125 lock to guide holes 127. A release 129 is provided to unlock CPU module 110 from docking bar 25 when removing CPU module 110. A power-in connector 131 is provided for receiving AC power, and a video-in connector 133 is provided for receiving a video input signal from a separate computer.

Figure 5:
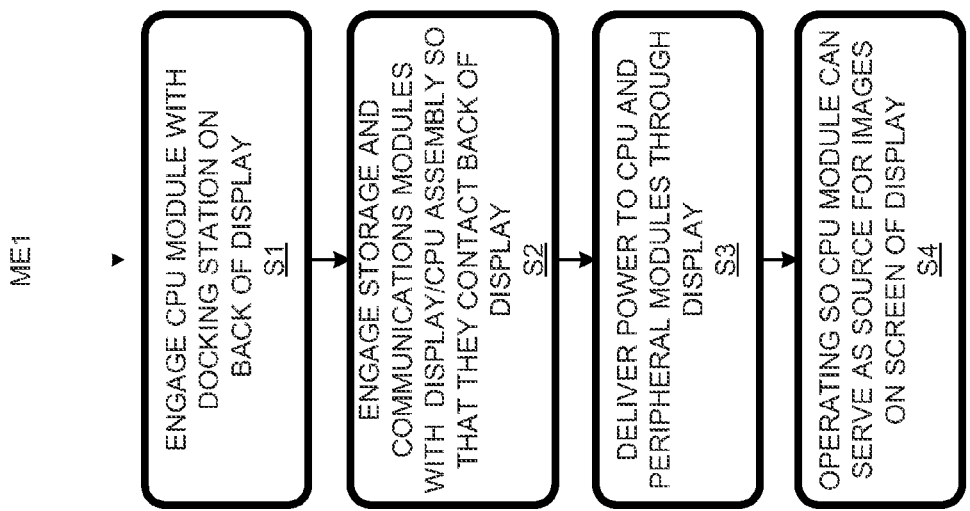
FIG. 5 is a flow chart of a method of using the modular computers of FIGS. 1 and 4.

Turning to FIG. 5, a method MEI in accordance with an embodiment of the invention provides for attaching a CPU module to a display so that they are rigidly and physically attached and electrically connected to the display at step S1. At step S2, peripheral modules are attached to the display/CPU assembly resulting from step S1 so that the peripheral modules contact the display and are electrically connected to the display/CPU assembly. At step S3, power is supplied to peripheral modules through the display. In the illustrated embodiments, power is supplied to peripheral modules through the display via the CPU module. At step S4, images generated by the resulting processor slice are presented on the display.

Herein, a "CPU module" is a module that contains a data processor, memory, and communications devices all connected via a system bus. A "hard disk module" is a module that includes one or more storage disks. A "graphics module" is a module including a graphics card to enhance processing of graphics data. An "optical drive module" is a module for reading and possibly writing to optical disks such as CDs, CDRs, CDRWs, DVDs, DVDRs, DVDRWs, and Blu-ray disks. An "I/O module" provides for communications with devices other than those included with the subject all-in-one computer; the devices can include hard disks, printers, faxes, flash memory cards, USB devices, etc. A "flash drive module" is a storage module that uses flash memory as the storage medium. A "UPS module" is a module that provides battery back-up in case of an AC power failure; such a module can allow time to save work before a computer shuts down in response to a power failure. Herein, the terms "vertical" and "lateral" are relative to the normal orientation of a display regardless of the actual orientation of the display.

The embodiments of the invention provide for different numbers of peripheral modules per assembly, and different form factors for the display, CPU module, and peripheral modules. Peripheral modules can receive power directly from the display or via the CPU module. Different support structures are provided for, including central base stands and plural support legs. Some embodiments provide separate connections for separate computers, while others do not.

The foregoing description, for purposes of explanation, has been described with reference to specific embodiments. However, the illustrative discussions are not intended to be exhaustive or to limit the invention to the precise forms disclosed. Many modifications and variations are possible in view of the disclosed teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A modular computer comprising:
   a display assembly including a display, said display having a front side and a back side, said front side opposing said back side, said display including a display screen on said front side and a docking station on said back side, said display assembly having a power input connector;
   a CPU module, said CPU module including an exterior housing and a CPU docking connector attached to the exterior housing, said CPU docking connector for electrically connecting and physically attaching said CPU module to said docking station; and
   at least one peripheral module for electrically communicating with at least one of the display assembly and the CPU module, wherein said at least one peripheral module is to receive power from at least one of the display assembly and the CPU module, wherein said at least one peripheral module is positioned outside of the exterior housing of the CPU module and is to communicate with the CPU module through a cableless interconnection with at least one of the display assembly and the CPU module, and wherein the at least one peripheral module comprises a graphics module having a graphics processor for processing graphics displayed on the display.

2. A modular computer as recited in claim 1 wherein said display assembly has a support to support the display and the at least one peripheral module when said at least one peripheral module is attached to at least one of the CPU module and the display assembly.

3. A modular computer as recited in claim 1 wherein said at least one peripheral module includes at least one storage module and at least one communications module.

4. A modular computer as recited in claim 1 wherein the at least one peripheral module enables the CPU module to operate as a computer.

5. A modular computer as recited in claim 1 wherein said CPU module has a vertical connection with said docking station and said at least one peripheral module includes a lateral cableless connection with said CPU module, and wherein said at least one peripheral module is removable from the CPU module while the CPU module is attached to the docking station.

6. A modular computer as recited in claim 1 wherein said display assembly includes a video-in connector for connecting to an external computer that is not attached to said docking station.

7. A modular computer as recited in claim 6 wherein said video-in connector is accessible when said CPU module is attached to said docking station.

8. A modular system comprising:
   a display assembly having a front side and a back side, said display assembly including a display screen on the front side and a connector on the back side;
   a CPU module removably connected to the connector and attached to the back side of the display assembly, wherein the CPU module comprises an exterior housing, said exterior housing comprising a plurality of docking connectors for cablelessly connecting to a plurality of peripheral modules while the CPU module is connected to the connector, and wherein the CPU module does not include a graphics processor or a hard disk drive; and
   a release to remove the CPU module from the back side of the display assembly.

9. A modular system comprising:
   a display assembly having a front side, said display assembly including a display screen on the front side and including a connector;
   a CPU module including an exterior housing and a CPU docking connector attached to the exterior housing, said CPU docking connector removably connected to the connector to communicate with the display assembly; and
   a peripheral module including a peripheral connector to connect to one of the display assembly and the CPU module, wherein the peripheral module is positioned outside of the exterior housing of the CPU module and is to communicate with the CPU module through a cableless interconnection with one of the display assembly and the CPU module, and wherein the peripheral module comprises a graphics module having a graphics processor for processing graphics displayed on the display.

10. The system of claim 9, further comprising:
a power-in connector on the display assembly to receive power from a wall outlet and supply power to the CPU module.

11. The system of claim 9, wherein the CPU module does not include a graphics processor or a hard disk drive within the exterior housing.

12. The system of claim 9, wherein the peripheral module is to be cablelessly connected with the exterior housing of the CPU module while the CPU module is attached to the connector of the display assembly.

13. The system of claim 9, wherein the display assembly has a back side opposite the front side and wherein the connector is on the back side.

14. The system of claim 13, wherein the CPU module and the peripheral module are connected to the back side of the display assembly.

15. The system of claim 14, wherein the CPU module and the peripheral module are connected to the back side of the display assembly and cover an area that is substantially equivalent to an area of the display assembly.

16. The system of claim 9, further comprising a docking station attached to the display assembly including the connector and a power supply.

17. The system of claim 16, wherein the docking station supplies power to the CPU module and the display assembly.

18. The system of claim 9, wherein the CPU module comprises substantially only a data processor, a memory, and communications devices connected via a system bus.

19. The system of claim 18, wherein the peripheral module is a device that enables the CPU module to operate as a computer.

20. The system of claim 9, further comprising a release to remove the CPU module.

* * * * *